US010952234B2

(12) United States Patent
Yu et al.

(10) Patent No.: US 10,952,234 B2
(45) Date of Patent: Mar. 16, 2021

(54) FULL-DUPLEX ASSISTED COMMUNICATIONS WITH INTERFERENCE MITIGATION

(71) Applicants: Huawei Technologies Canada Co., Ltd., Ottawa (CA); The Governing Council of the University of Toronto Banting Institute, Toronto (CA)

(72) Inventors: Wei Yu, Toronto (CA); Kaiming Shen, Toronto (CA); Mohammadhadi Baligh, Ottawa (CA); Reza Khosravi Farsani, Toronto (CA)

(73) Assignees: HUAWEI TECHNOLOGIES CANADA CO., LTD., Ottawa (CA); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 16/225,813

(22) Filed: Dec. 19, 2018

(65) Prior Publication Data

US 2020/0008230 A1    Jan. 2, 2020

Related U.S. Application Data

(60) Provisional application No. 62/692,431, filed on Jun. 29, 2018.

(51) Int. Cl.
*H04L 5/00* (2006.01)
*H04W 72/12* (2009.01)
(Continued)

(52) U.S. Cl.
CPC ....... *H04W 72/1289* (2013.01); *H04L 5/0055* (2013.01); *H04W 72/082* (2013.01); *H04W 88/02* (2013.01); *H04W 88/08* (2013.01)

(58) Field of Classification Search
CPC ........................................................ H04L 5/00
See application file for complete search history.

(56) References Cited

U.S. PATENT DOCUMENTS

| | | | |
|---|---|---|---|
| 2014/0241254 A1* | 8/2014 | Kaur | H04W 76/14 370/329 |
| 2017/0079065 A1 | 3/2017 | Lyu et al. | |

(Continued)

OTHER PUBLICATIONS

Shen, K., et al., "Achievable Rates and Outer Bounds for Full-Duplex Relay Broadcase Channel with Side Message", IEEE International Symposium on Information Theory, Jan. 2019, 5 Pages.

(Continued)

*Primary Examiner* — Sulaiman Nooristany

(57) ABSTRACT

In accordance to embodiments, a base station may transmit to a first user equipment (UE) a downlink control information (DCI) message for uplink (UL) scheduling of a second UE. The DCI message may indicate resources for sending a UL message by the second UE to the base station such that the first UE can at least partially decode the UL message based on the information in the DCI message. The base station may receive the UL message from the second UE. The base station may send a downlink (DL) message to the first UE. The UL message and the DL message may overlap at least partially in time and frequency. If the DL UE cannot successfully decode the UL message, the base station may send a helper message for the UL message to help the DL to decode the UL message.

8 Claims, 6 Drawing Sheets

(51) Int. Cl.
*H04W 72/08* (2009.01)
*H04W 88/08* (2009.01)
*H04W 88/02* (2009.01)

(56) References Cited

U.S. PATENT DOCUMENTS

2017/0290046 A1* 10/2017 Sun .................... H04W 72/082
2017/0331573 A1    11/2017 Li
2018/0063865 A1     3/2018 Islam et al.
2019/0372647 A1* 12/2019 Su ............................ H04L 5/00

OTHER PUBLICATIONS

Shen, K., et al., "Capacity Limits of Full-Duplex Cellular Network", 2018 IEEE Information Theory Workshop (ITW), Nov. 2018, 5 Pages.

* cited by examiner

FULL-DUPLEX ASSISTED COMMUNICATIONS WITH INTERFERENCE MITIGATION

This patent application claims priority to U.S. Provisional Application No. 62/692,431, filed on Jun. 29, 2018 and entitled "Full-duplex Assisted Communications," which is hereby incorporated by reference herein as if reproduced in its entirety.

TECHNICAL FIELD

The present disclosure relates generally to wireless communications and, in particular, to methods and systems for full-duplex assisted communications with or without sidelinks (SLs).

BACKGROUND

A full-duplex communications device can communicate data in two directions simultaneously. In contrast, a half-duplex communications device can communicate data in two directions, but not simultaneously. The half-duplex communications device can only communicate data one direction at a time.

In a full-duplex wireless system, a base station is often capable of simultaneous communications in both the uplink (UL) direction and the downlink (DL) direction. However, the user equipments (UEs) are often half-duplex. As such, the full-duplex base station often selects a pair of different UEs to perform simultaneous UL and DL communications, respectively. During the UL and DL communications, the base station usually handles the downlink to uplink (DL2UL) interference. On the other hand, the uplink to downlink (UL2DL) interference may or may not exist depending on the inter-UE channel between the served UEs in the UL direction and in the DL direction. Traditionally, to avoid the UL2DL interference, a base station selects two UEs that are far from each other, one UE in the UL direction, and the other UE in the DL direction. With the densification of the wireless networks, the traditional UE selection approach may no longer be feasible. Thus, it is desirable to improve the interference mitigation in the full-duplex wireless systems. In addition, the inter-UE channel (i.e., a sidelink) allows for direct information transmission from one UE (e.g., a UL UE) to another UE (e.g., a DL UE). The inter-UE channel enables new communication scenarios/applications in addition to the UL and DL communications to/from the base station. So, it is also desirable to improve the quality and efficiency of sidelink communications in the full-duplex wireless systems.

SUMMARY OF THE INVENTION

Technical advantages are generally achieved, by embodiments of this disclosure which describe methods and systems for full-duplex assisted communications.

In accordance to embodiments, a base station may transmit to a first user equipment (UE) a downlink control information (DCI) message for uplink (UL) scheduling of a second UE. The first UE may be a downlink (DL) UE. Based on the information in the DCI message, the DL UE may decode at least a part of the UL UE message in order to improve the decoding of the DL message sent by the base station. The DCI message may indicate resources for sending a UL message by the second UE to the base station such that the first UE can at least partially decode the UL message based on the information in the DCI message. The base station may receive the UL message from the second UE. The base station may send a DL message to the first UE. The UL message and the DL message may overlap at least partially in time and frequency. If the DL UE cannot successfully decode the UL message, the base station may send a helper message for the UL message to help the DL to decode the UL message. The help message may comprise hybrid automatic repeat request (HARQ) bits for the UL message. Additionally, the base station may assist the DL UE to decode a sidelink message transmitted from the UL UE to the DL UE.

Apparatuses, as well as computer program products, for performing the methods are also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. These and other inventive aspects are described in greater detail below.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Full-duplex communications are one of the important enabling features in modern-day communications systems (e.g., 5G, WiFi, and many other current/future standards). Full-duplex communications effectively double the bandwidth (BW) associated to the UEs. In a full-duplex wireless system, network nodes (e.g., base stations) are more likely to be full-duplex. On the other hand, UEs are more likely to be half-duplex devices. In some full-duplex wireless communications systems, UE to UE (UE2UE) (i.e., UL2DL, cross-UE, or inter-UE) interference may become a dominant interference source in the full-duplex networks. It is desirable that the full-duplex network nodes (e.g., base stations) can facilitate the cancellation or mitigation of the inter-UE interference or help relaying the sidelink (SL) communications between two UEs.

Figure 1:
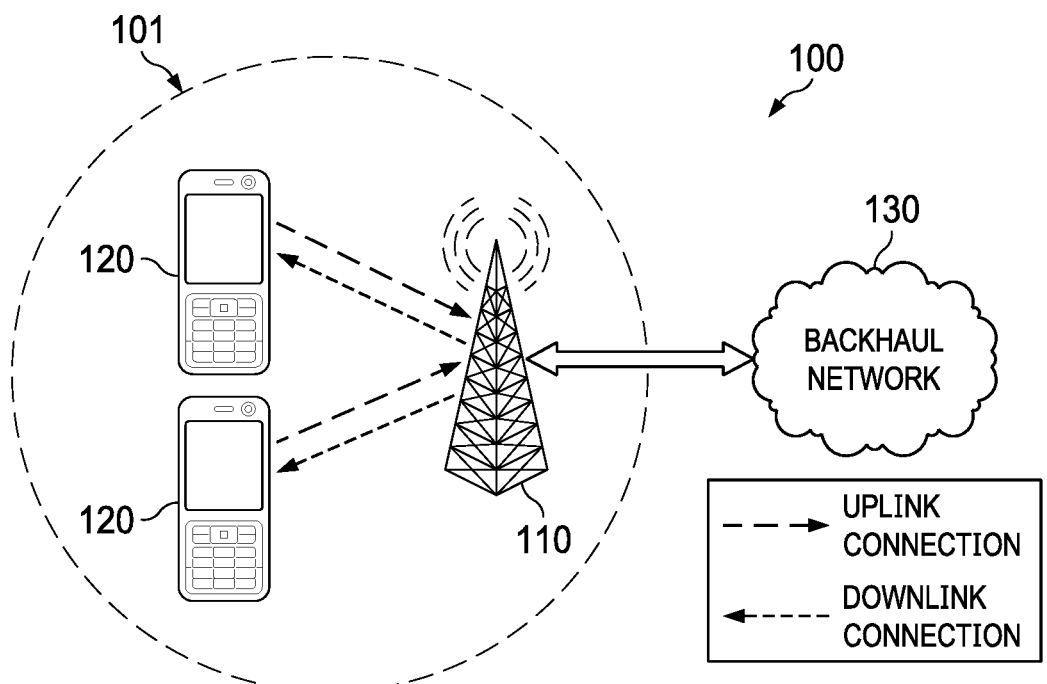
FIG. 1 is a diagram of an embodiment wireless communications network.

FIG. 1 is a diagram of a network 100 for communicating data. The network 100 comprises a base station 110 having a coverage area 101, a plurality of user equipments (UEs) 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a "Node B," an enhanced Node B (eNB), a next generation Node B (gNB), a transmit/receive point (TRP), a macro-cell, a femtocell, a Wi-Fi access point (AP), and other wirelessly enabled devices. Base stations may provide wireless access in accordance with one or more wireless communications protocols, e.g., 5th generation "New Radio" (NR), Long Term Evolution (LTE), LTE Advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
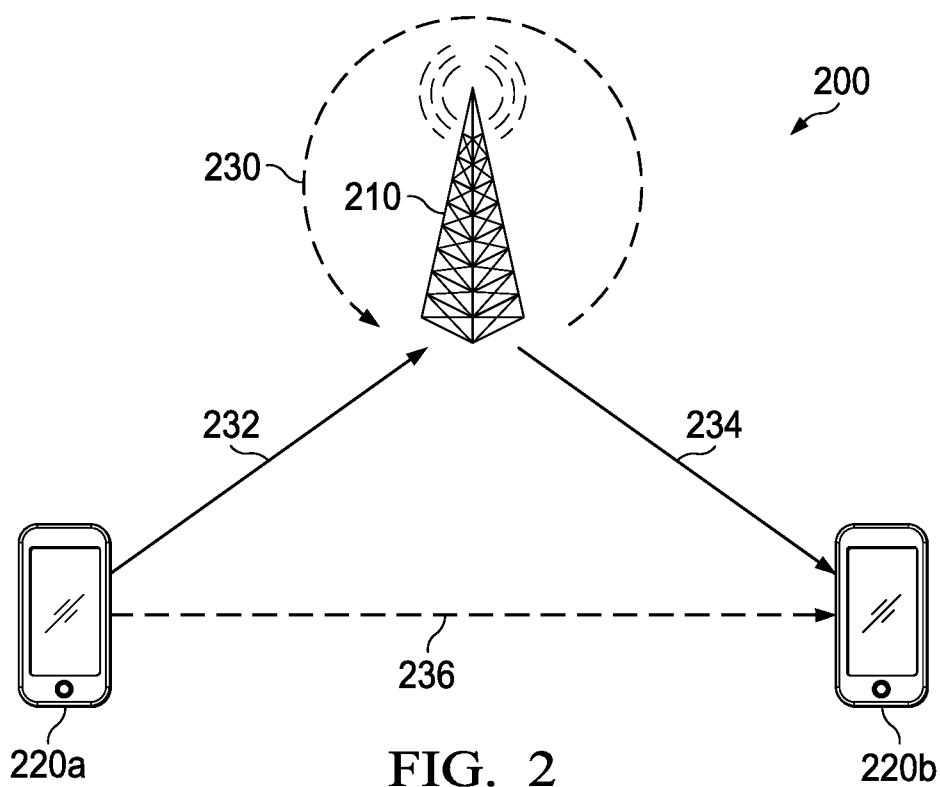
FIG. 2 shows a full-duplex wireless communications system with at least three nodes in the system, according to some embodiments.

FIG. 2 shows a full-duplex wireless communications system 200 with at least three nodes in the system. FIG. 2 shows three nodes for illustration purpose. A full-duplex wireless communications system can support many more nodes. In FIG. 2, the network node 210 is the base station, such as the base station 110 as described with respect to FIG. 1. The node 220a is the UL UE, and the node 220b is the DL UE. The UL UE 220a and the DL UE 220b may be UEs 120 as described with respect to FIG. 1. The UL UE 220a uses the UL channel 232 to send UL messages to the base station 210. The base station 210 uses the DL channel 234 to send DL messages to UE 220b. The UE 220a may also use the SL channel 236 to send data to the UE 220b. The base station 210 is a full-duplex base station that can simultaneously receive UL messages from the UE 220a and transmit DL messages to the UE 220b. The base station 210 may also be capable of actively removing the self-imposed interference as shown by the channel 230.

The base station 210 may use the same time and/or frequency resources to simultaneously receive a UL message from the UL UE 220a and transmit a DL message to the DL UE 220b. The UL message is intended for the base station and the UL message may eventually be intended for (e.g. destined or addressed to) a UE different from the DL UE 220b. If the UL UEs 220a and the DL 220b are close to each other, the UL message from the UL UE 220a may interfere with the DL message transmitted by the base station 210 to the DL UE 220b, causing UL2DL interference. In embodiments described in this disclosure, a full-duplex base station may at least partially help the DL UE 220b to decode and cancel the UL2DL interference and increase the experienced signal to interference-plus-noise ratio (SINR) for the DL UE 220b. Moreover, embodiments described herein allow for the UL UE 220a to send data in an SL message to the DL UE 220b, and the DL UE 220b may decode the SL message with the help of the full-duplex base station 210. By the base station 210 sending to the DL UE 220b the information related to the UL messages and/or the SL messages transmitted by UL UE 220a, the base station 210 helps the DL UE 220b to decode the UL messages and/or the SL messages. Accordingly, as compared to the conventional systems, the described technique improves efficient utilization of network resources and enhances performance of network devices for wireless communications.

In a first embodiment scenario, a full-duplex base station may help mitigate the UL2DL interference. In the first embodiment scenario, there are only DL messages and UL messages in wireless system 200. This first embodiment scenario does not consider SL information related to the SL channel 236 in FIG. 2. In one example, for the simplicity of explanation, the resources used by the UL UE 220a for UL transmissions and the resources used by the DL UE 220b for DL receptions, as decided by the scheduler of the network, may fully overlap. The resources may include time and/or frequency resources. In other examples, the resources used by the UL UE 220a for UL transmissions and the resources used by the DL UE 220b for DL receptions may partially overlap. In some embodiments, the DL UE 220a is assigned with resources that span over multiple UL UEs including the UL UE 220a. In these embodiments, the network (e.g., the base station 210) may help the DL UE 220b to decode and cancel interferences from one or multiple of such UL UEs that share at least some resources with the DL UE 220b. In other embodiments, the UL UE 220a is assigned with resources that span over multiple DL UEs including DL UE 220b.

In some embodiments, the UL message from the UL UE 220a is a common message, and there may be other UL messages from the UL UE 220a that are private. A "common message" may refer to a message where more than one receiving nodes in the network have access to the message's properties and try to at least decode the message or mitigate the interference caused by that message. Each of the more than one receiving nodes may or may not be interested in the content of the message. In other embodiments, the UL message may include a common portion and a private portion. In the example embodiments described herein, the common portion of the UL message is the portion for which the network shares the properties with the DL UE such that DL UE can decode and/or mitigate the interference caused by this portion of the UL message to the intended DL message. The common message (or portion) may also be referred to as a "shared" message (or portion). In contrast, a "private message" (or portion) is a message where its properties and attributes are hidden from one node. As such, that node cannot decode or mitigate the interference caused by the private message (or portion) using advanced receiving techniques and can only use traditional interference mitigation techniques such as minimum mean square error (MMSE) to reduce the impact of the interference. While embodiments may describe common and private portions of the UL message, the private portion may or may not exist. The UL message (or the common portion in the UL message) is intended for the base station 210. The DL UE 220*b* is not interested in receiving the UL message (or the common portion in the UL message). However, by decoding and discarding the UL message (or the common portion in the UL message), the DL UE 220*b* can reduce the UL2DL interference caused by the UL UE 220*a*. The common portion and the private portion of the UL message are also known as the decodable portion and the non-decodable portion by the DL UE 220*b*, respectively. In one embodiment, the common portion may be a broadcast message, and the private portion may be a unicast message.

In conventional wireless systems, the network (e.g., the base station 210) schedules both a UL message for the UL UE 220*a* and a DL message for the DL UE 220*b*. The DL UE 220*b* may take the signal of the UL message over channel 232 as interference, without trying to actively decode and cancel the signal of the UL message. The DL UE 220*b* may use minimum mean square error (MMSE) or other interference mitigation schemes to reduce the negative impact of the UL2DL interference.

In embodiments described in this disclosure, a DL UE (e.g., the DL UE 220*b*) may successfully decode the UL2DL interference with possible help from the full-duplex base station (e.g., the base station 210).

Figure 3:
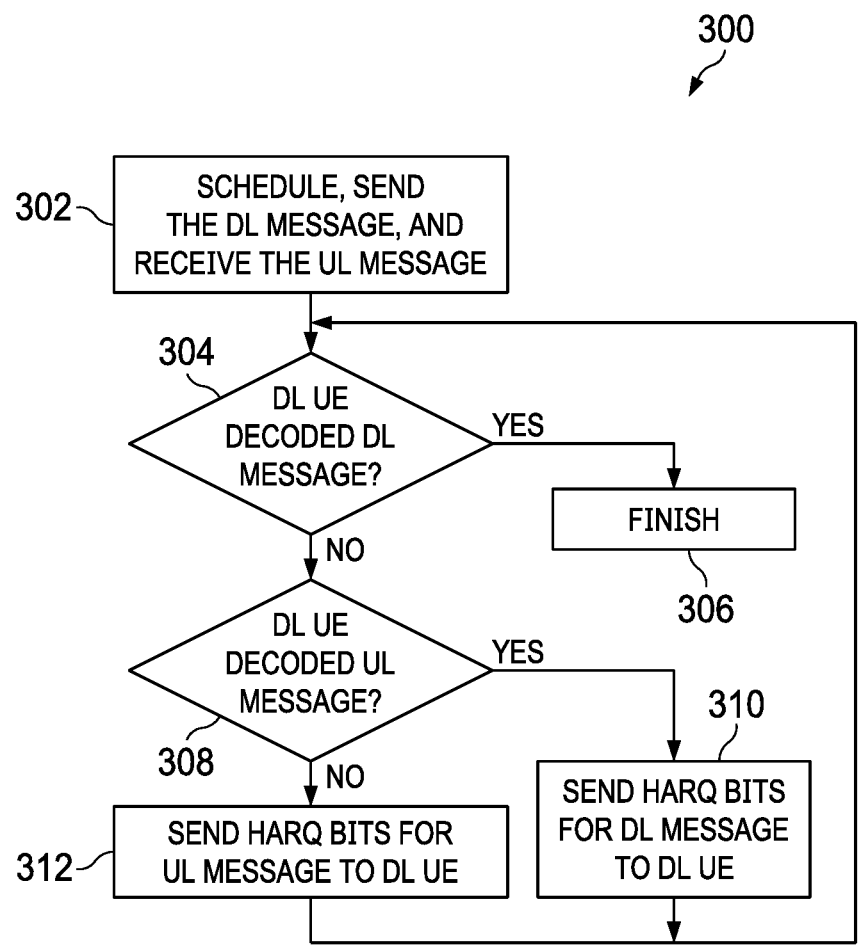
FIG. 3 illustrates an example flow chart of a process for full-duplex assisted communications without considering the sidelink (SL), according to some embodiments.

FIG. 3 illustrates an example flow chart of a process 300 for full-duplex assisted communications without considering the sidelink, according to some embodiments. The process 300 is described from the perspective of the full-duplex base station (e.g., the base station 210). At operation 302, the base station schedules both the UL UE and the DL UE. The base station may allocate all the modulation and coding schemes (MCSs), precoders, and other attributes of the transmissions from the UL UE to the base station and from the base station to the DL UE. The attributes of the transmissions may include the assigned resources (e.g., time and/or frequency resources). In one embodiment, the assigned resources for the UL UE and the assigned resources for the DL UE may fully overlap. In another embodiment, the assigned resources for the UL UE and the assigned resources for the DL UE partially overlap. As a part of operation 302, the base station may inform the DL UE about the transmission attributes used by the UL UE for transmission of the UL message. In one example, the base station may send a downlink control information (DCI) message to inform the DL UE about the transmission attributes used by the UL UE for transmitting the UL message to the base station. The base station may send the DL message to the DL UE while listening to the UL UE to decode the UL message transmitted by the UL UE. As a part of operation 302 (not shown in FIG. 3), if the base station fails to successfully decode the UL message, the base station may schedule for hybrid automatic repeat request (HARQ) bits (or retransmission) for the UL message from UL UE. Retransmission may include any mechanism to help a decoding node decoding a message. For example, the base station may send a DCI message to the UL UE for scheduling the HARQ bits of the UL message from the UL UE, or for retransmission of the UL message from the UL UE. Without the knowledge of the UL message, the base station may not be able to help the DL UE to decode and cancel the UL interference caused by the UL UE. As a part of operation 302, when the UL message includes the common portion and the private portion in some embodiments, the DL UE may to try to decode the DL message and the common portion of the UL message (taking the private portion of the UL message as interference). Such decoding may be based on maximum likelihood decoding (MLD), successive interference cancellation (SIC), message passing algorithm (MPA), or other linear and non-linear receivers for joint decoding and/or interference cancellation. In general, joint decoders (including MLD and MPA) provide better performance than SIC receivers, and SIC receivers provide better performance than linear receivers.

At operation 304, the base station determines whether the DL UE has successfully decoded the DL message based on the ACK/NACK signaling received from the DL UE. If the DL UE has successfully decoded the DL message, the DL UE may send an ACK message for the DL message to the base station. After the base station receives the ACK message for the DL message, the process 300 ends at operation 306.

If the DL UE has not successfully decoded the DL message, the DL UE may send a NACK message for the DL message to the base station. Alternatively, without receiving a NACK for the DL message, the base station may determine unsuccessful decoding of the DL message by the DL UE based on a predetermined timeout value. Accordingly, at operation 308, the base station determines whether the DL UE has successfully decoded the UL message transmitted by the UL UE based on the ACK/NACK signaling received from the DL UE or timeout. If the DL UE has successfully decoded the UL message, the DL UE may send an ACK message for the UL message to inform the base station that the DL UE has successfully decoded the UL message (i.e., the UL2DL interference is fully removed).

If the UL2DL interference is fully removed but the DL UE still cannot decode the DL message, at operation 310, the base station may send HARQ bits for the DL message to the DL UE to help the DL UE to decode the DL message. Otherwise, the base station may send HARQ bits for the UL message to the DL UE at operation 312 to help the DL UE to decode the UL message. In either case, the process 300 continues from operation 304 again, and the DL UE tries to decode the DL message again. Sending HARQ bits for either the DL message or HARQ bits for the UL message to the DL UE increases the likelihood for the DL UE to decode the DL message successfully. This loop continues until the DL UE can successfully decode the DL message, and the process 300 finishes at operation 306.

As described above, in some embodiments, the UL message comprises of two superposing portions: the UL common portion and the UL private portion. Each portion of the UL message may have its own precoders and MCS allocations. The common and private portions may use the same or different transmission schemes, such as orthogonal frequency-division multiple access (OFDMA), sparse code multiple access (SCMA), and non-orthogonal multiple access (NOMA), etc. The MCS for each portion may be allocated such that the DL UE can successfully decode the UL2DL interference with possible help from the full-duplex base station.

In some embodiments, the ACK message (associated with the UL message) from the DL UE to the base station may not exist, and the base station may make the decision in operation 308 based on other pieces of evidence, such as the long term statistics of the DL channel 234. In some other embodiments, operation 308 may not exist, and the base station may send HARQ bits for both the DL message and the UL message to the DL UE. In some embodiments, the base station may only send HARQ bits for the DL data message to the DL UE. In yet other embodiments, the base station may send HARQ bits for the UL message to the DL UE for the first several retransmissions (e.g., based on a predetermined threshold value), and, after that, the base station may send HARQ bits for the DL message to the DL UE. In still some other embodiments, the base station may ask the UL UE to send HARQ bits for the UL message to the DL UE to help the DL UE to decode the UL message.

Figure 4:
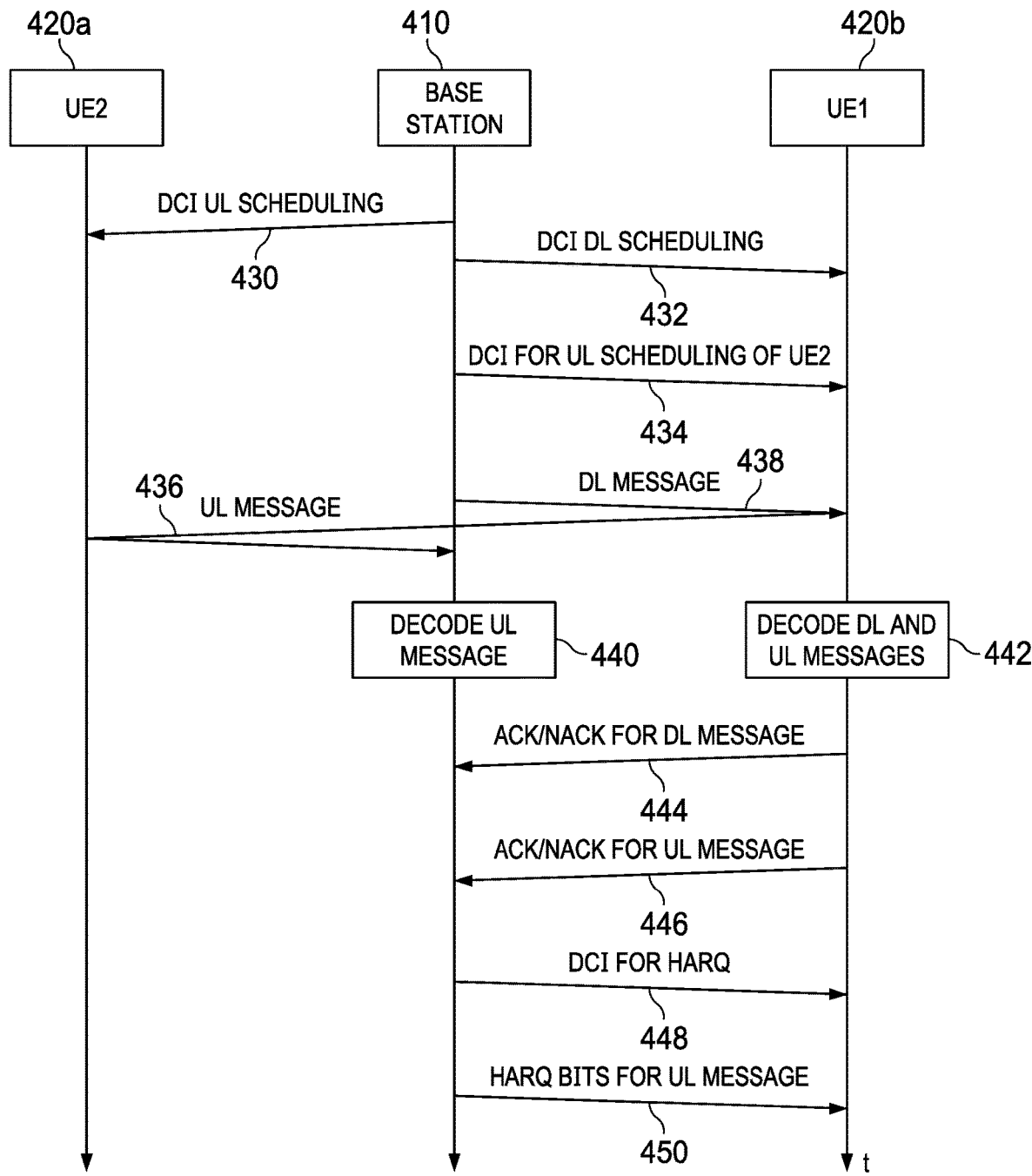
FIG. 4 shows a message flow among the base station, a first UE, and a second UE for full-duplex assisted communications without considering the SL, according to some embodiments.

FIG. 4 shows a message flow 400 among the base station 410, the UE1 420b, and the UE2 420a for full-duplex assisted communications without considering the SL. The base station 410 may be the base station 210. The UE1 420b may be the DL UE 220b, and the UE2 420a may be the UL UE 220a.

Message flow 400 may correspond to the part of the process 300 that includes operations 302, 304, 308, and 312. The base station 410 may send a DCI message 430 to the UE2 420a for scheduling UL transmissions by the UE2 420a. The DCI message 430 may comprise information for indicating the MCS, precoders, and other attributes (e.g., the assigned time and/or frequency resources) for the UL transmissions from the UE2 420a. The base station 410 may send a DCI message 432 for scheduling DL transmissions to the UE1 420b. The DCI message 432 may comprise information for indicating the MCS, precoders, and other attributes (e.g., the assigned time and/or frequency resources) for the DL transmissions to the UE1 420b.

The base station 410 may also send to the UE1 420b a DCI message 434 for scheduling UL transmissions by the UE2 420a. In one embodiment, the DCI message 434 sent to the UE1 420b may contain the same information as the DCI message 430 sent to the UE2 420a. In another embodiment, the DCI message 434 may contain a portion of the information (e.g., the assigned time and/or frequency resources) in the DCI message 430 to help the UE1 420b to decode the UL message 436. The assigned resources for the UE1 420b and the assigned resources for the UE2 420a may fully overlap. In another embodiment, the assigned resources for the UE1 420b and the assigned resources for the UE2 420a may partially overlap.

The base station 410 may simultaneously receive the UL message 436 from UE2 420a and transmit the DL message 438 to UE1 420b. The communications of the UL message 436 and the DL message 438 at least partially overlap in time and in frequency. At operation 440, the base station 410 may decode the UL message 436. At operation 442, the UE1 420b may decode the DL message 438. The UE1 420b may also decode the UL message 436 based on the information in the DCI message 434. The base station 410 may receive an ACK or a NACK message 444 from the UE1 420b to indicate whether the UE1 420b has successfully decoded the DL message 438. If the message 444 is a NACK message, the base station determines that the UE1 420b has not successfully decoded the DL message 438. If so, the base station 410 may then receive an ACK or a NACK message 446 from the UE1 420b to indicate whether the UE1 420b has successfully decoded the UL message 436. If the message 446 is a NACK message, the base station determines that the UE1 420b has not successfully decoded the UL message 436. If so, the based station 410 may then send a DCI message 448 for the HARQ to the UE1 420b. Then, the based station 410 may send to the UE1 420b the message 450, which includes HARQ bits for the UL message 436 to help the UE1 420b to decode the UL message 436. As described with respect to FIG. 3, the decoding process continues from operation 442 until the DL UE1 420b can decode the DL message.

With the embodiments described above with respect to the first scenario, the overhead of sending the HARQ bits for the DL message is reduced and the interference caused by the UL message is removed by virtue of decoding and cancelling (using techniques such as SIC). The UE is more likely to decode the UL message using the first transmission or with the reduced HARQ overhead.

In a second embodiment scenario, a full-duplex base station may help SL communications, such as data communications from the UE 220a to the UE 220b over the SL channel 236. The second embodiment scenario may be an extension of the first embodiment scenario described above. In the example wireless system 200, the UL UE 220a may use the same resources allocated for the DL UE 220b and the UL UE 220a to transmit an SL message to the DL UE 220b. Similar to the first embodiment scenario described above, in some embodiments, the allocated resources for the UL and DL communications may fully or partially overlap. For example, resources for the DL message may overlap with resources for multiple UL messages, or vice versa.

In one example, for the simplicity of explanation, the resources used by the UL UE 220a for UL transmissions and the resources used by the DL UE 220b for DL transmissions may fully overlap. Moreover, there might be some additional SL specific resources allocated to the UL UE 220a for sending the SL data to the DL UE 220b. In this case, independent data streams may be transmitted through the SL specific resources. Also, HARQ bits for SL or UL messages can be sent through the dedicated SL specific resources.

In this example, there may be three messages to be transmitted in wireless system 200: (1) the UL message from the UL UE 220a to the base station 210, (2) the DL message from the base station 210 to the DL UE 220b, and (3) the SL message from the UL UE to the DL UE. In some embodiments, the UL UE 220a may divide its transmissions into three parts: (i) the UL message which the base station 110 tries to decode and which the DL UE 220b takes as a noise, (ii) the SL message which the base station 110 may take as noise, or try to decode and discard, and which the DL UE 220b tries to decode, and (iii) a common message that both the DL UE 220b and the base station 110 try to decode. In some embodiment, the common message may encapsulate two portions. The DL UE 220b may be interested in a first portion (e.g., SL portion) and discard a second portion (e.g., UL portion) of the common message after decoding. The base station 110 may be interested in the second portion (e.g., UL portion) and discard the first portion (e.g., SL portion) of the common message after decoding. In some embodiments, the common message may be confined into one code, and the DL UE 220b and the base station 110 cannot differentiate between the two portions of the common message until the common message is decoded. In some other embodiments, the two portions of the common message may be two independent transmissions with different MCSs, precoders, and transmission modes. Also, not all the components need to exist in this second scenario. For example, the same procedure described herein can be applied when the wireless system 200 does not have the SL message, or the UL portion of the common message.

Figure 5:
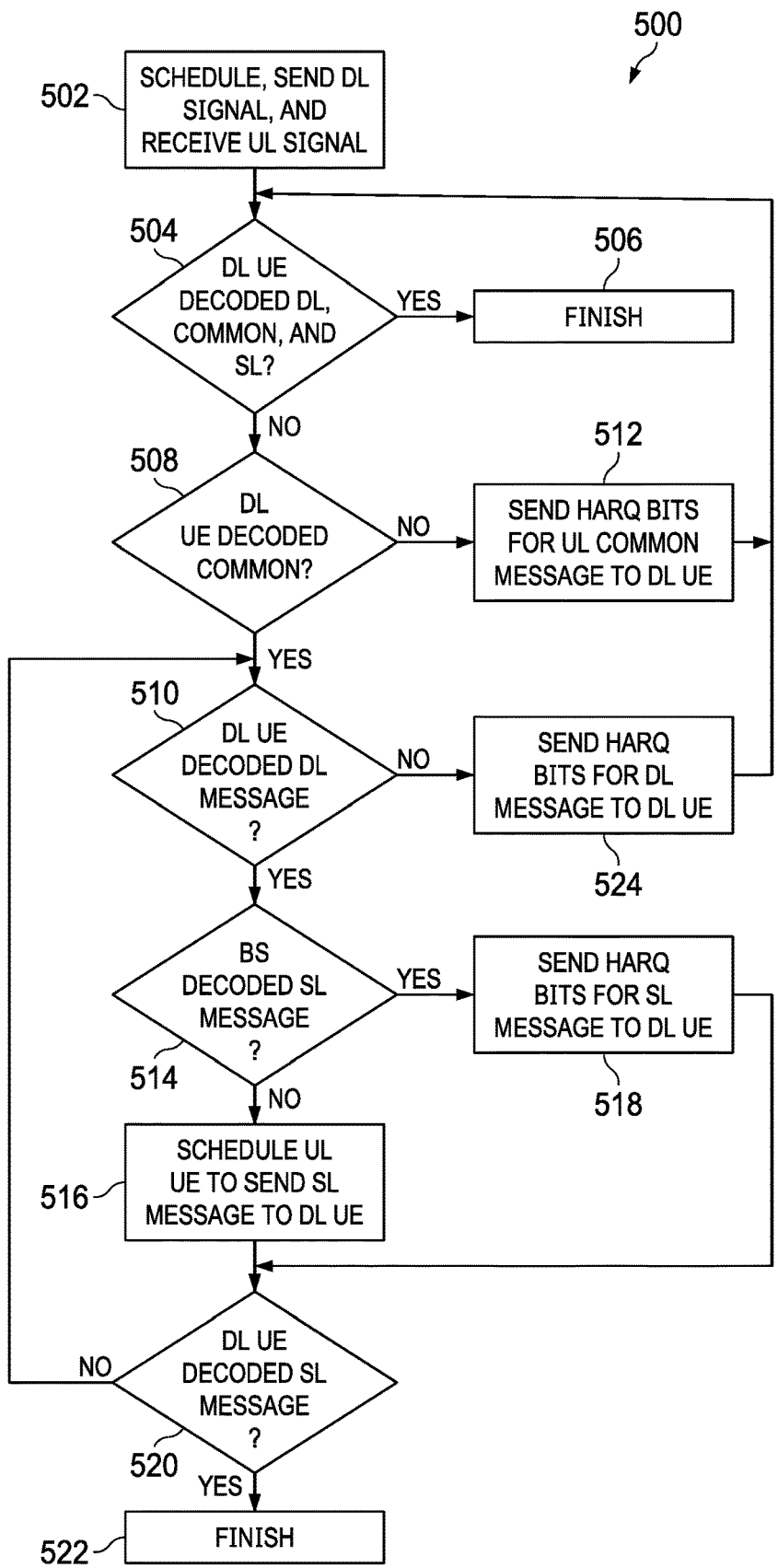
FIG. 5 illustrates an example flow chart of a process for full-duplex assisted communications with the sidelink, according to some embodiments.

FIG. 5 illustrates an example flow chart of a process 500 for full-duplex assisted communications with the sidelink, according to some embodiments. The process 500 is described from the perspective of the full-duplex base station. At operation 502, the network (e.g., the base station) schedules four messages, three for the UL UE (including the UL message, the SL message, and the common message) and one for the DL UE (the DL message). The base station may inform all the scheduling information to the relevant UEs. For example, the base station may send to the UL UE one or more DCI scheduling messages that indicate the allocated MCSs, precoders, and other attributes (e.g., time and frequency resources) for the transmissions of the UL message, the SL message, and the common message. The base station may send to the DL UE a DCI scheduling message that indicates the allocated MCS, precoder, and other attributes (e.g., time and frequency resources) for the transmission of the DL message. The allocated resources for the UL message, the SL message, the common message, and the DL message may fully or partially overlap. In addition, the base station may send to the DL UE another DCI message indicating the attributes (e.g., time and frequency resources) of the common message and the SL message.

Then, the base station may send the DL message to the DL UE while listening to the UL UE to try to decode the UL message, the common message, and possibly the SL message. The base station continues to communicate with the UL UE until the base station can successfully decode the UL message and common message, either successively or jointly. For example, if the base station fails to successfully decode the UL message or the common message, the base station may send a DCI message to the UL UE requesting for hybrid automatic repeat request (HARQ) bits (or retransmission) for the UL message or the common message from UL UE. Without the knowledge about the UL message and the common message, the base station may be unable to help the DL UE to cancel/reduce the UL2DL interference or to decode the SL message transmitted from the UL UE. The DL UE may also try to decode, based on the resource information provided in the DCI messages, the UL message, the SL message, and the common message sent by the UL UE, either successively or jointly.

At operation 504, the base station may determine whether the DL UE has successfully decoded the DL message, the SL message, and the common message. If the DL UE has not successfully decoded all of the DL message, the SL message, and the common message, the process 500 proceeds to operation 508. Otherwise, the DL UE may send to the base station one or more ACK messages for indicating the successful decoding of all the above messages, and the process 500 ends at operation 506.

At operation 508, the network (e.g., base station), based on the ACK/NACK signaling from the DL UE, determines whether the DL UE has successfully decoded the common message. For example, the base station may receive an ACK message indicating that the DL UE has successfully decoded the common message. If so, the process 500 proceeds to operation 510. Otherwise, the base station may receive a NACK message indicating that the DL UE has not successfully decoded the common message, and the base station may send to the DL UE HARQ bits for the common message at operation 512. The DL UE tries to decode all of the above messages again, and the process 500 continues from operation 504.

At operation 510, after the DL UE has already decoded the common message, the base station determines whether the DL UE has successfully decoded the DL message. For example, the base station may receive an ACK message indicating that the DL UE has successfully decoded the DL message. If so, the process 500 proceeds to operation 514. Otherwise, the base station may send to the DL UE HARQ bits for the DL message at operation 524. The DL UE may try to jointly decode the remaining messages using the extra HARQ bits sent by the base station, and the process 500 continues from operation 504.

At operation 514, the DL UE has already decoded the common message and the DL message. The only remaining message is the SL message transmitted from the UL UE for the DL UE to decode. At operation 514, the base station may determine whether the base station itself has successfully decoded the SL message. In some cases, the base station has not tried to decode the SL message, or the base station has tried to decode the SL message but failed. Thus, at operation 516, the base station may schedule the UL UE to retransmit the SL message to the DL UE or send HARQ bits for the SL message to the DL UE. For example, the base station may send a DCI message to the UL UE that instructs the UL UE to send HARQ bits for the SL message to the DL UE or retransmit the SL message to the DL UE.

In some cases, the BS has successfully decoded the SL message. If so, at operation 518, the base station itself may send the HARQ bits for the SL message to the DL UE. Again, the DL UE will try to decode the remaining SL message. The base station may determine, at operation 520, whether the DL UE has successfully decoded the SL message based on the ACK/NACK signaling received from the DL UE. If the decoding of the SL message is successful, the process 500 ends at operation 522. Otherwise, the process 500 continues again from operation 510.

Similar to the full-duplex assisted UL2DL interference mitigation described in the first example scenario, several alternative embodiments may apply to the second embodiment scenario. In some embodiments, the ACK/NACK signaling for the common message does not exist. In some embodiments, the DL UE may send the ACK/NACK signaling for the SL message to the UL UE, rather than to the base station. As such, the UL UE sends HARQ bits for the SL message (or retransmits the SL message) to the DL UE through either (i) allocated resources by the base station for the SL message, or (ii) contention-based (i.e., grantless) or contention free (i.e., grant-based) SL resources that are not used by the DL and UL transmissions. Other alternative embodiments described with respect to the first scenario (i.e., full-duplex assisted communications without SL) may also apply to embodiments on the second scenario (i.e., full-duplex assisted communications with SL).

Figure 6A:
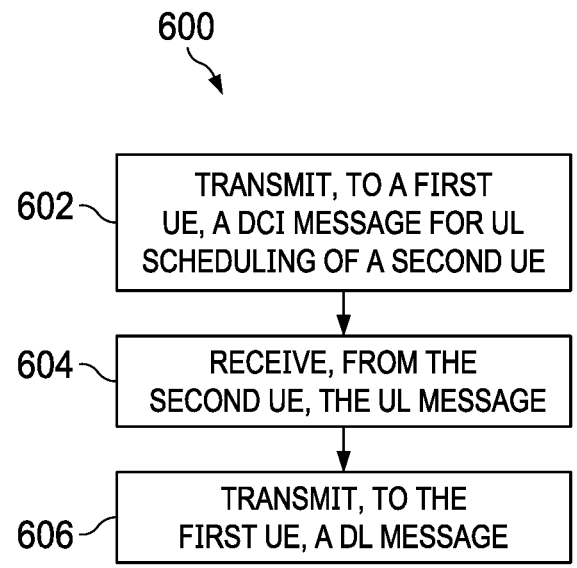
FIG. 6A illustrates a flowchart of a method for full-duplex assisted communications in a wireless system, according to some embodiments.

FIG. 6A illustrates a flowchart of a method 600 for full-duplex assisted communications in a wireless system, according to some embodiments. The method 600 may be carried out or performed by hardware of a base station, such as the base station 210 in FIG. 2. The method 600 may also be carried out or performed by routines, subroutines, or modules of software executed by one or more processors of the base station. The method 600 may further be carried out or performed by a combination of hardware and software. Coding of the software for carrying out or performing the method 600 is well within the scope of a person of ordinary skill in the art having regard to the present disclosure. The method 600 may include additional or fewer operations than those shown and described and may be carried out or performed in a different order. Computer-readable code or instructions of the software executable by the one or more processor of the base station may be stored on a non-transitory computer-readable medium, such as for example, memory of the base station.

Method 600 starts at operation 602, where the base station may transmit to a first UE (e.g., the DL UE 220*b*) a DCI message for UL scheduling of a second UE (e.g., the UL UE 220*a*). The DCI message may indicate resources for sending a UL message by the second UE to the base station such that the first UE can at least partially decode the UL message based on the information in the DCI message. The UL message may be destined or addressed to a UE that is different from the first UE.

At operation 604, the base station may receive the UL message from the second UE. At operation 606, the base station may send a DL message to the first UE. The UL message and the DL message may overlap at least partially in time and frequency.

The base station may further receive, from the first UE, an ACK message or a NACK message for the UL message. The ACK message or the NACK message may indicate whether the first UE has successfully decoded the UL message. In one embodiment, the base station may receive from the first UE a NACK message for the UL message indicating unsuccessful decoding of the UL message by the first UE. The base station may then transmit a helper message for the UL message to the first UE to help the first UE to decode the UL message transmitted by the second UE and mitigate interference caused by the UL message. The helper message comprises hybrid automatic repeat request (HARQ) bits for the UL message.

In another embodiment, the base station may determine that decoding of the UL message by the first UE is unsuccessful based on, for example, a predetermined timeout value. The base station may then transmit a helper for the UL message to the first UE to help the first UE to decode the UL message.

In one embodiment, the base station may determine that decoding of the UL message by the first UE is successful and that decoding of the DL message by the first UE is unsuccessful. The base station may then transmit to the first UE a helper message for the DL message (e.g. HARQ bits for the DL message) to help the first UE to decode the DL message.

Alternatively, instead of the base station sending the helper message for the DL message for the UL message (e.g. HARQ bits) to the first UE to help the first UE to mitigate interference caused by the UL message, the base station may schedule the second UE to repeat the UL message. For example, the base station may receive, from the first UE, a NACK message for the UL message indicating unsuccessful decoding of the UL message by the first UE. Then, the base station may transmit to the second UE a second DCI message for scheduling the second UE to transmit a helper message for the UL message (e.g., HARQ bits for the UL message) to the first UE or retransmit the UL message to the first UE.

Additionally, in some embodiments, the base station may help the first UE to decode an SL message transmitted from the second UE to the first UE. The base station may decode the SL message transmitted from the second UE to the first UE. Based on successful decoding of the SL message by the base station, the base station may transmit to the first UE a helper message for the SL message (e.g., HARQ bits for the SL message) to help the first UE to decode the SL message. On the other hand, based on unsuccessful decoding of the SL message by the base station, the base station may transmit to the second UE a second DCI message for scheduling the second UE to transmit a helper message for the SL message (e.g., HARQ bits for the SL message) to the first UE or retransmit the SL message to the first UE.

Figure 6B:
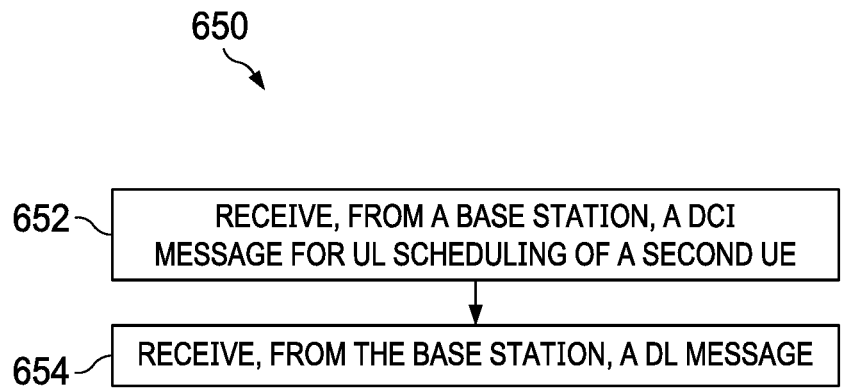
FIG. 6B illustrates a flowchart of a method for full-duplex assisted communications in a wireless system, according to some embodiments.

FIG. 6B illustrates a flowchart of a method 650 for full-duplex assisted communications in a wireless system, according to some embodiments. The method 650 may be carried out or performed by hardware of a UE, such as the DL UE 220*b* in FIG. 2. The method 650 may also be carried out or performed by routines, subroutines, or modules of software executed by one or more processors of the UE. The method 650 may further be carried out or performed by a combination of hardware and software. Coding of the software for carrying out or performing the method 650 is well within the scope of a person of ordinary skill in the art having regard to the present disclosure. The method 650 may include additional or fewer operations than those shown and described and may be carried out or performed in a different order. Computer-readable code or instructions of the software executable by the one or more processor of the UE device may be stored on a non-transitory computer-readable medium, such as for example, memory of the UE device.

Method 650 starts at operation 652, where the first UE (e.g., the DL UE 220*b*) may receive from a base station a DCI message for UL scheduling of a second UE (e.g., the UL UE 220*a*). The DCI message may indicate resources for sending a UL message by the second UE to the base station such that the first UE can at least partially decode the UL message based on the information in the DCI message. The UL message may be destined or addressed to a UE that is different from the first UE.

At operation 654, the first UE may receive from the base station a DL message. The UL message transmitted by the second UE and the DL message may overlap at least partially in time and frequency.

Figure 6C:
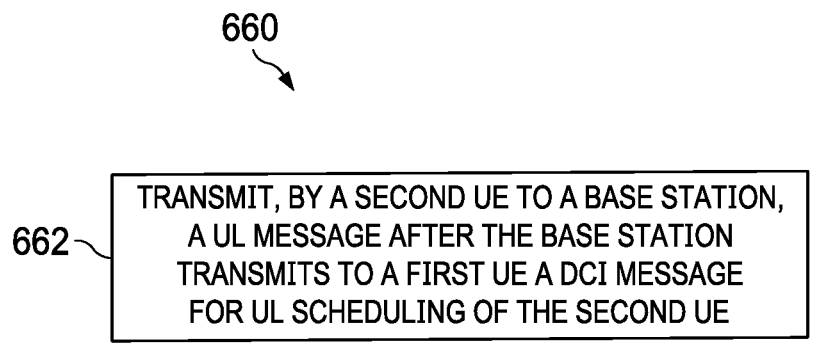
FIG. 6C illustrates a flowchart of a method for full-duplex assisted communications in a wireless system, according to some embodiments.

FIG. 6C illustrates a flowchart of a method 660 for full-duplex assisted communications in a wireless system, according to some embodiments. The method 660 may be carried out or performed by hardware of a UE, such as the UL UE 220*a* in FIG. 2. The method 660 may also be carried out or performed by routines, subroutines, or modules of software executed by one or more processors of the UE. The method 660 may further be carried out or performed by a combination of hardware and software. Coding of the software for carrying out or performing the method 660 is well within the scope of a person of ordinary skill in the art having regard to the present disclosure. The method 660 may include additional or fewer operations than those shown and described and may be carried out or performed in a different order. Computer-readable code or instructions of the software executable by the one or more processor of the UE device may be stored on a non-transitory computer-readable medium, such as for example, memory of the UE device.

At operation 662 of the method 660, a second UE may transmit, to a base station, a UL message after the base station transmits to a first UE a DCI message for UL scheduling of the second UE. The DCI message indicates resources for sending the UL message by the second UE such that the first UE can at least partially decode the UL message based on the DCI message and mitigate interference caused by the UL message. The UL message transmitted by the second UE and a DL message from the base station to the first UE overlap at least partially in time and in frequency.

The first UE may further transmit, to the base station, an ACK message or a NACK message for the UL message. The ACK message or the NACK message may indicate whether the first UE has successfully decoded the UL message. In one embodiment, the first UE may further transmit, to the base station, a NACK message for the UL message indicating unsuccessful decoding of the UL message by the first UE. The first UE may then receive from the base station a helper message for the UL message to help the first UE to decode the UL message transmitted by the second UE and mitigate interference caused by the UL message. The helper message may comprise hybrid automatic repeat request (HARQ) bits for the UL message.

In the above described embodiments, the UEs in a full-duplex system are aware of the presence of some decodable/cancelable interference. The UEs do not even need to know the nature of the node(s) sending the interference to the UEs, as long as the UEs have enough information to decode and cancel the unwanted interference or receive data from other sources by transforming the interference to signals.

The embodiments described herein may use various types of signaling. Reference signals (RSs) may be used for measurement and reporting resources, which allow the UEs to measure various required channels including the SL channel 236 that is key in determining the MCS, precoders, and transmission attributes for the common message and the SL message. DCI signaling may be used for scheduling and transmission schemes for the initial and HARQ retransmissions of the messages from either of the sources (e.g., the UL UE and the base station). ACK/NACK signaling may be used to indicate whether the DL UE has successfully decoded all the messages (e.g., the UL message, the DL message, the common message, and the SL message). Additional signaling may be used to indicate UE capabilities, such as inter-UE discovery, advanced receiver (e.g., SIC) capabilities, etc.

Techniques described herein may apply to any other scenarios where the UE may be impacted by multiple nodes. These scenarios may include inter-cell and intra-cell joint transmissions. These scenarios may also include virtual full-duplex systems, where each of multiple Tx/Rx points (TRPs) in the same cell is half-duplex, but the multiple TRPs can mimic a full-duplex system using flexible time-division duplexing (TDD) at the UEs.

Appendix A, titled "Capacity Limits of Full-Duplex Cellular Network," is related to subject matter of the present application. Appendix A is incorporated herein by reference in its entirety.

Figure 7:
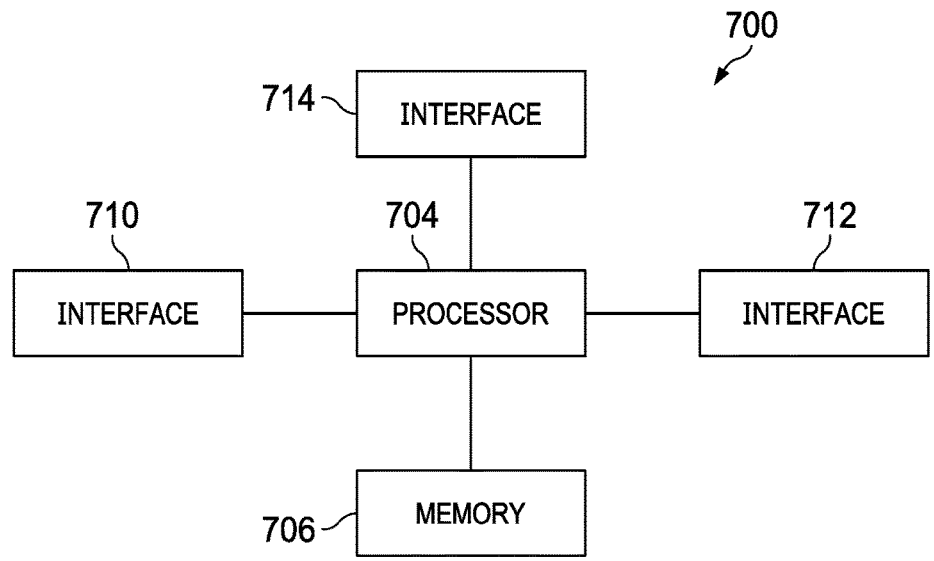
FIG. 7 is a block diagram of an embodiment processing system for performing methods described herein.

FIG. 7 illustrates a block diagram of an embodiment processing system 700 for performing methods described herein, which may be installed in a host device. As shown, the processing system 700 includes a processor 704, a memory 706, and interfaces 710-714. The processor 704 may be any component or collection of components adapted to perform computations and/or other processing related tasks, and the memory 706 may be any component or collection of components adapted to store programming and/or instructions for execution by the processor 704. A means for configuring a transmitter and a receiver for a UE may include processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
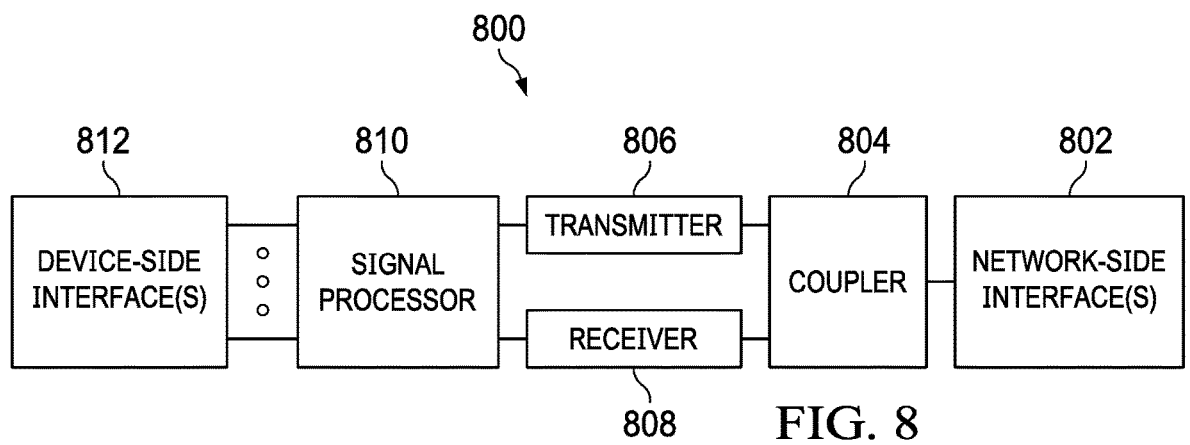
FIG. 8 is a block diagram of a transceiver adapted to transmit and receive signaling over a telecommunications network according to example embodiments described herein.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The network-side interface 802 may also include any component or collection of components adapted to transmit or receive signaling over a short-range interface. The network-side interface 802 may also include any component or collection of components adapted to transmit or receive signaling over the radio interface between the UE and the radio access network (RAN), such as the Uu interface (also called the air interface in 5G). The coupler 804 may include any component or collection of components adapted to facilitate bi-directional communications over the network-side interface 802. The transmitter 806 may include any component or collection of components (e.g., up-converter, power amplifier, etc.) adapted to convert a baseband signal into a modulated carrier signal suitable for transmission over the network-side interface 802. A means for transmitting an initial message of an access procedure may include transmitter 806. The receiver 808 may include any component or collection of components (e.g., down-converter, low noise amplifier, etc.) adapted to convert a carrier signal received over the network-side interface 802 into a baseband signal. A means for receiving mobile subscriber identifiers, initial downlink messages of access procedures, and forwarded requests to connect to a network may include receiver 808.

The signal processor 810 may include any component or collection of components adapted to convert a baseband signal into a data signal suitable for communications over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communications (NFC), etc.).

In such embodiments, the network-side interface 802 comprises one or more antenna/radiating elements. For example, the network-side interface 802 may include a single antenna, multiple separate antennas, or a multi-antenna array configured for multi-layer communications, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, the network-side interface of a UL UE may include a multi-antenna array configured for SIMO or MIMO. In these embodiments, the UL UE may use multiple antennas to transmit the UL message and the SL message at the same time. In one embodiment, the UL UE may simultaneously transmit the UL message and the SL message using the technique of beamforming (i.e., spatial multiplexing). An example of spatial multiplexing is zero-forcing beamforming. In another embodiment, the UL UE may simultaneously transmit the UL message and the SL message using the technique of dirty-paper coding, which is a technique for performing interference pre-subtraction. In these embodiments, the signaling sequence for the UL UE using multiple antennas is the same as the signaling sequence as described above, and the UL UE and SL messages can be transmitted together at the same time. Both the UL UE message and the SL message may also include respective common messages. The full-duplex base station may help the decoding of the common messages at the DL UE, which in turn helps the decoding of the private messages at the DL UE.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
    receiving, by a first user equipment (UE) from a base station, a downlink control information (DCI) message for uplink (UL) scheduling of a second UE, the DCI message indicating resources for transmitting a UL message by the second UE such that the first UE can at least partially decode the UL message based on the DCI message and mitigate interference caused by the UL message; and
    receiving, by the first UE from the base station, a downlink (DL) message, wherein the UL message transmitted by the second UE and the DL message overlap at least partially in time and in frequency;
    the method further comprising:
    receiving, by the first UE from the second UE, a sidelink (SL) message, wherein the base station decodes the SL message transmitted from the second UE to the first UE, the SL message transmitted by the second UE simultaneously with the UL message using a beamforming technique.

2. The method of claim 1, further comprising:
    receiving, by the first UE from the base station, a helper message for the UL message to help the first UE to decode the UL message after the base station determines that decoding of the UL message by the first UE is unsuccessful.

3. The method of claim 1, further comprising:
    receiving, by the first UE from the base station, a helper message for the DL message to help the first UE to decode the DL message after the base station determines that decoding of the UL message by the first UE is successful and that decoding of the DL message by the first UE is unsuccessful.

4. The method of claim 1, further comprising:
    transmitting, by the first UE to the base station, an NACK message for the UL message indicating unsuccessful decoding of the UL message by the first UE; and
    receiving, by the first UE, at least one of:
        a helper message for the UL message, from the base station, to help the first UE to decode the UL message;
        a helper message for the UL message, from the second UE, or retransmission of the UL message after the base station transmits to the second UE a second DCI message for scheduling the second UE to transmit the helper message for the UL message or retransmit the UL message to the first UE.

5. A first user equipment (UE), comprising:
    a processor; and
    a non-transitory computer readable storage medium storing programming for execution by the processor, the programming including instructions for:
    receiving, from a base station, a downlink control information (DCI) message for uplink (UL) scheduling of a second UE, the DCI message indicating resources for transmitting a UL message by the second UE such that the first UE can at least partially decode the UL message based on the DCI message and mitigate interference caused by the UL message; and
    receiving, from the base station, a downlink (DL) message, wherein the UL message transmitted by the second UE and the DL message overlap at least partially in time and in frequency;
    the programming further including instructions for:
    receiving, from the second UE, a sidelink (SL) message, wherein the base station decodes the SL message transmitted from the second UE to the first UE, the SL message transmitted by the second UE simultaneously with the UL message using a beamforming technique.

6. The first UE of claim 5, the programming further including instructions for:
    receiving, from the base station, a helper message for the UL message to help the first UE to decode the UL message after the base station determines that decoding of the UL message by the first UE is unsuccessful.

7. The first UE of claim 5, the programming further including instructions for:
    receiving, from the base station, a helper message for the DL message to help the first UE to decode the DL message after the base station determines that decoding of the UL message by the first UE is successful and that decoding of the DL message by the first UE is unsuccessful.

8. The first UE of claim 5, the programming further including instructions for:
transmitting, to the base station, an NACK message for the UL message indicating unsuccessful decoding of the UL message by the first UE; and
receiving at least one of:
a helper message for the UL message, from the base station, to help the first UE to decode the UL message; or
a helper message for the UL message, from the second UE, or retransmission of the UL message after the base station transmits to the second UE a second DCI message for scheduling the second UE to transmit the helper message for the UL message or retransmit the UL message to the first UE.

* * * * *